UNITED STATES PATENT OFFICE.

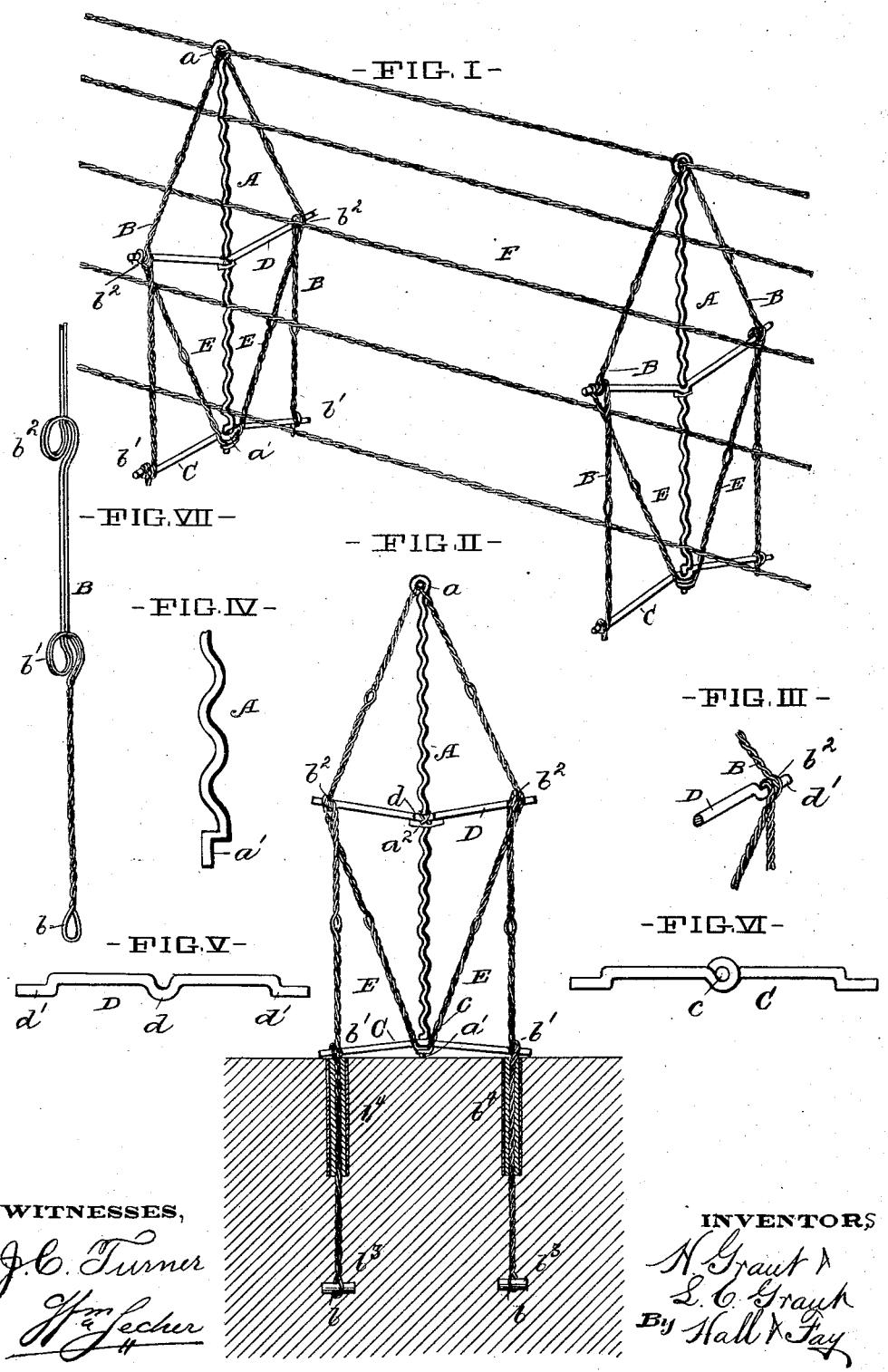

HURLBERT GRANT, OF TIFFIN, AND LEWIS C. GRANT, OF WILLOUGHBY, OHIO.

FENCE-POST.

SPECIFICATION forming part of Letters Patent No. 567,385, dated September 8, 1896.

Application filed November 19, 1894. Serial No. 529,286. (No model.)

*To all whom it may concern:*

Be it known that we, HURLBERT GRANT, a resident of Tiffin, county of Seneca, and LEWIS C. GRANT, a resident of Willoughby, county of Lake, State of Ohio, citizens of the United States, have invented certain new and useful Improvements in Fence-Posts, of which the following is a specification, the principle of the invention being herein explained, and the best mode in which we have contemplated applying that principle so as to distinguish it from other inventions.

The annexed drawings and the following description set forth in detail one mechanical form embodying the invention, such detail construction being but one of various mechanical forms in which the principle of the invention may be used.

In said annexed drawings, Figure I represents a perspective view of a wire fence provided with our improved wire-and-rod-fence post; Fig. II, an elevation of the fence-post constructed according to our method; Fig. III, a perspective detail view of one end of the upper cross-brace and of the brace-wires attached to it; Fig. IV, a detail view of the lower end of the central rod; Figs. V and VI, views, respectively, of the upper and lower crossbrace; and Fig. VII, a view of an anchor-wire before it is placed in the post.

The fence-post has a central rod A, formed with an eye $a$ at its upper end and with a shouldered lower end $a'$. The rod is preferably slightly crimped or corrugated, not, however, sufficiently to render it longitudinally compressible or expansible under ordinary strain. Anchor-wires B are secured to the eye at the upper end of the rod and have their lower ends anchored in the ground. Said anchor-wires consist each of a doubled wire having an eye $b$ at its doubled lower end and eyes $b'$ and $b^2$ at distances apart. The portion of the anchor-wire between the anchor-eye $b$ and the lower eye $b'$ is twisted, an anchor-block $b^3$ of any suitable material is inserted in the eye, and the twisted portion is inserted through a protecting casing $b^4$, which extends from the surface of the ground to a point where the changes in the moisture of the ground are so slight as to not affect the wire. The casing and the entire lower portion of the anchor-wire is buried in the ground, a suitable hole having been dug in the ground and afterward filled and tamped around the casing and wire. The casing is preferably a tube filled with a suitable cement. The lower shouldered end of the central rod is inserted through an eye $c$, formed at the middle of an upwardly-arched cross-brace C, and the ends of said cross-brace are shouldered and are inserted into the lower eyes $b'$ of the anchor-wires. A downwardly-arched upper cross-brace D is formed with an open eye or crimp $d$ at its middle, which straddles the central rod and is prevented from slipping down upon the same by a washer $a^2$, shrunk or otherwise secured upon the rod. The ends $d'$ of said cross-brace are shouldered and are inserted through the upper eyes $b^2$ of the anchor-wires. After the anchor-wires have been secured to the cross-braces, they are twisted by the insertion of a suitable tool at points midway between their points of attachment to the center rod and to the cross-braces, so that all slack of the wires will be taken up. Two downwardly-converging braces E are secured to the lower shouldered end of the central rod, below the cross-brace, and to the ends of the upper cross-brace, and are formed from doubled wires twisted similarly to the anchor-wires. The panel-wires F of the fence, or whatever the panels of the fence are composed of, are secured to the central rod. When twisted wires are employed, the central rod is preferably inserted between the strands of such twisted wires.

The downward strain upon the central rod of the post, caused by the weight of the fence-panels, will be principally borne by the upwardly-arched cross-brace which supports the shouldered lower end of the central rod, and which will have a tendency to be flattened by said strain. The flattening of the cross-brace will, however, be counteracted by the strain against its ends from the anchor-wires, which will thus prevent the brace from becoming flattened. The downward strain upon the central rod will also be borne by the downwardly-converging braces, which will transmit such strain to the ends of the downwardly-arched upper cross-brace, exerting a flattening strain upon the latter. Such flattening strain will, however, be counteracted by the support which the ends of the upper cross-brace receive from the upper portions of the anchor-wires, and by the fact that said brace can not be straightened unless the upper portions of the anchor-wires can yield outward or downward, neither of which motions they can have on account of their being locked by the upper ends of the downwardly-converging braces and on account of their being secured to the upper end of the central rod. The fence-post will thus be completely trussed and will form a rigid and light structure. The posts may be first made and placed in position, whereupon the fence-panels may be supported from the posts, or wires may first be strung at the proper relative heights, supported from suitable supports, whereupon the posts may be built upon the panel-wires. The trussing of the post, as well as the twisted wires which form the anchor-wires and braces, will allow for all contraction and expansion on account of changes in temperature. The shoulders at the lower end of the central rod and at the ends of the cross-brace are preferably formed, as illustrated in the drawings, by twice bending the end of the rod at a right angle. The twists in the anchor and brace wires are not made until the parts of the post are assembled, and consequently just the proper tension may be given to each part of the post, and a perfectly straight structure may at all times be made. The method of constructing trussed fence-posts, which consists in assembling the compression members, the central rod, and the cross-brace, by the untwisted tension members, the anchor-wires and brace-wires, and then getting the proper tension by twisting the tension members, we consider an important feature in a trussed fence-post, as it admits of a perfectly even trussed structure being made.

Other modes of applying the principle of our invention may be employed for the mode herein explained. Change may therefore be made as regards the mechanism thus disclosed, provided the principles of construction set forth respectively in the following claim are employed.

We therefore particularly point out and distinctly claim as our invention—

A fence-post consisting of a central rod having an eye at its upper end and formed with a shouldered lower end; anchor-wires having means for anchoring their lower ends, having two eyes formed upon them, and having their upper ends secured to the eye of the central rod; an upwardly-arched cross-brace having an eye upon its middle for the shouldered lower end of the central rod and having shouldered ends inserted through the lower eyes of the anchor-wires, a downwardly-arched cross-brace secured at its middle to the central rod and having shouldered ends inserted through the upper eyes of the anchor-wires, and brace-wires having their upper ends secured to the ends of the upper cross-brace and their lower ends secured to the lower end of the central rod, substantially as set forth.

In testimony that we claim the foregoing to be our invention we have hereunto set our hands this 31st day of October, A. D. 1894.

HURLBERT GRANT.
LEWIS C. GRANT.

Witnesses:
J. W. LOVE,
JAMES H. PLATT.